United States Patent Office 3,238,274
Patented Mar. 1, 1966

3,238,274
PROCESS FOR CURING UNSATURATED POLYESTERS USING A VANADIUM COMPOUND AND AN ACID PHOSPHATE ESTER AS CATALYSTS
Leslie Harold Allan, Penarth, Wales, assignor to The Distillers Company Limited, Edinburgh, Scotland, a British company
No Drawing. Filed Feb. 15, 1961, Ser. No. 89,351
Claims priority, application Great Britain, Feb. 23, 1960, 6,325/60
12 Claims. (Cl. 260—863)

The present invention relates to an improved process for the production of cured products derived from unsaturated polyesters.

The expression "unsaturated polyester" is used throughout this specification in its normal sense as covering the polycondensation products of dicarboxylic acids or anhydrides with dihydroxy alcohols when one of the reactants present during the polycondensation reaction contains non-aromatic unsaturation. Unsaturated polyesters can be modified by the presence in the polycondensation reaction mixture of monocarboxylic acids, monohydroxy alcohols and small amounts of polycarboxylic acids or polyhydroxy alcohols. Particularly valuable unsaturated polyesters are obtained by esterifying saturated dihydric alcohols, such as ethylene glycol, diethylene glycol, triethylene glycol, trimethylene glycol, α-propylene glycol and 1:3-butylene glycol with α-unsaturated α,β-dicarboxylic acids, such as maleic, fumaric, itaconic and citraconic acids. This type of unsaturated polyester resin may be modified by replacing some of the unsaturated dibasic acids with an equivalent quantity of another dicarboxylic acid, such as, for example, succinic, adipic, sebacic, phthalic, azelaic, tetrahydrophthalic, endomethylene tetrahydrophthalic or hexachloroendomethylene tetrahydrophthalic acids.

Unsaturated polyesters are generally cured in the presence of an unsaturated monomer capable of copolymerising with the unsaturated polyester. Examples of such monomers are styrene, which is the most commonly employed, methyl methacrylate, ethylene glycol dimethacrylate, ethyl acrylate, acrylonitrile, vinyl acetate, diallyl phthalate, the vinyl phenols, diallyl maleate and triallyl cyanurate.

The rate of cure of unsaturated polyesters and their mixtures with copolymerisable monomers is usually increased by the presence of polymerisation catalysts such as peroxides and hydroperoxides. Examples of suitable catalysts are benzoyl peroxide, chlorbenzoyl peroxide, lauroyl peroxide, caprylyl peroxide, 1-hydroxycyclohexyl hydroperoxide-1 and methyl ethyl ketone peroxide. In order to increase the effectiveness of the polymerisation catalyst and to enable the unsaturated polyester composition to be cured at or near room temperature, accelerators or promoters are often added to the unsaturated polyester composition. One class of accelerator consists of metal salts such as cobalt and vanadium naphthenates.

The use of such metal salts has the disadvantage that the resultant cured product is often badly discoloured. For example, the use of cobalt produces pink colored products in some cases and green colored products in others. Similarly the use of vanadium salts has hitherto been associated with products having a green discoloration.

An object of the present invention is to provide an improved process for the cure of unsaturated polyesters using metal salt accelerators.

According to the present invention the process for the cure of a composition containing an unsaturated polyester comprises mixing the composition with a catalyst system including an organic peroxide or hydroperoxide and a solution of a vanadium compound in a liquid acid phosphate ester.

Any unsaturated polyester of the type hereinbefore described can be employed. Most suitably the compositions to be cured according to the process of the present invention contain in addition to the unsaturated polyester a monomer which can be copolymerised therewith. Any of the copolymerisable monomers hereinbefore mentioned, for instance styrene, can be employed. The ratio of unsaturated polyester to monomer in suitable compositions can be varied widely, for instance the composition may contain as little as 20% by weight of the unsaturated polyester. Most suitably the composition should contain from 40 to 80% by weight of unsaturated polyester and from 60 to 20% by weight of copolymerisable monomer.

A particular advantage of the process of the present invention is that by its use compositions containing unsaturated polyesters and difficultly copolymerisable monomers can be cured rapidly at room or slightly elevated temperatures. For instance it can be employed to copolymerise an unsaturated polyester with triallyl phosphate at room or slightly elevated temperatures to yield a cured product having good resistance to burning. Prior to the present invention such cured products could only be readily obtained by carrying out the curing process at a relatively high temperature. Mixtures of two or more monomers may be present in unsaturated polyester compositions to be cured according to the present invention. Cured products having good fire resistance can be obtained by curing at relatively low temperatures polyester compositions containing mixtures of triallyl phosphate, styrene and acrylonitrile. Hitherto such compositions have had to be cured at elevated temperatures.

Many of the customary peroxides or hydroperoxide used in the cure of polyester resins can be employed successfully in the process of the present invention. Examples of suitable peroxides are methyl ethyl ketone peroxide, cyclohexanone peroxide, tertiary butyl hydroperoxide, and methyl isobutyl ketone peroxide. Excellent results are obtained by the use of cumene hydroperoxide.

Many compounds of vanadium dissolve directly in liquid acid phosphate esters to give solutions which can be used directly as polymerisation accelerators. For example a freshly prepared organic salt of vanadium such as vanadium naphthenate dissolves in a warmed acid phosphate to give a clear solution. Similarly inorganic salts such as ammonium vanadate dissolve to give clear solutions. The preferred vanadium compound is vanadium oxide.

Alternatively the solution of the vanadium compound in a liquid acid phosphate ester can be formed in situ in the unsaturated polyester by separately adding an organic vanadium salt such as vanadium naphthenate and a liquid acid phosphate ester to the polyester, preferably before the addition of the peroxide catalyst.

Examples of suitable liquid acid phosphate esters which can be employed in the preparation of the accelerator solution may be represented by the formula

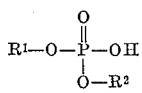

where $R^1$ represents an alkyl or aryl group and $R^2$ represents an alkyl or aryl group or hydrogen. Examples are di-butyl hydrogen phosphate, ethyl hydrogen phosphate, di-iso-octyl hydrogen phosphate, di-methyl hydrogen phosphate and di-nonyl hydrogen phosphate.

The use of solutions of vanadium compounds in liquid acid phosphate esters as polymerisation accelerators has considerable advantages over the use of vanadium compounds alone. It is found that the vanadium compounds are more stable in the presence of the acid phosphate and that the activity of the vanadium is considerably increased in the presence of the acid phosphate and thus smaller quantities of vanadium are required to achieve a given rate of cure. Moreover the color of the final product is considerably reduced by the presence of the acid phosphate.

The quantity of peroxidic catalyst employed in systems according to the present invention can be generally similar to the quantities which have hitherto been employed in effecting the cure of unsaturated polyesters at relatively low temperatures. However, owing to the rapid rate of cure achieved according to the present invention it is often possible to employ smaller quantities of catalyst than hitherto. For example peroxidic catalyst amounts in the range 0.1 to 6% by weight of the total polymerisable material can be employed successfully.

The concentration of vanadium in the liquid acid phosphate ester can be varied widely but is most suitably in the range 0.1% to 3% by weight. As the relative amount of acid phosphate to vanadium is increased, the color of the cured products is reduced. However, if too high a concentration of acid phosphate is present in the curing polyester there is a tendency in some cases for the resultant product to become hazy. For ease of handling it is often desirable to dilute the vanadium/acid phosphate solution with an inert solvent such as ethyl acetate or toluene. The quantity of vanadium added to the unsaturated polyester composition may be varied considerably but it is desirable to use the least quantity needed to give a suitable rate of cure. The optimum quantity employed will, of course, vary with the nature of the polyester and the quantity and type of peroxidic catalyst present. Generally amounts of vanadium in the range 0.00018% to 0.02% by weight of the total weight of polymerisable material present are suitable.

Although it is found that the presence of liquid acid phosphate esters inhibits the accelerating effect of the presence of cobalt salts on the rate of cure of some unsaturated polyester compositions containing a peroxidic catalyst, it has also been found that the presence of a soluble cobalt compound in compositions to be cured according to the present invention in some cases improves the drying of polyester films and gives rise to cured products with reduced color. When a cobalt compound such as cobalt octoate is added it is preferable to use a mixed peroxidic catalyst, e.g., a mixture of equal weight of cumene hydroperoxide, cyclohexanone peroxide and methyl ethyl ketone peroxide. The ratio of cobalt to vanadium in such systems can be varied widely according to the results required but for general purposes a ratio of about 5 parts by weight of cobalt to 3 parts by weight of vanadium is satisfactory. The total amount of vanadium and cobalt used varies with such factors as the composition of the polymerisable materials, the drying temperature and drying time required. Generally from 0.01 to 0.04% by weight of metal of the weight of polymerisable material present is satisfactory. Such mixed systems are particularly advantageous for unsaturated polyester compositions which are prone to develop a green coloration when cured in the presence of cobalt alone. By selecting an appropriate cobalt/vanadium ratio color can be minimised. A polyester composition which is cured in the presence of a mixture of vanadium and cobalt tends to have a longer gel time than the same polyester composition containing only one of the metals. Similarly in the production of films the composition containing both metals tends to have a slower setting time but it has a higher drying rate.

The following examples illustrate the cure of unsaturated polyester compositions according to the present invention. The cumene hydroperoxide solution used in all the examples is a commercially available catalyst consisting of a 70% solution of cumene hydroperoxide in a mixture of alcohols, ketones and cumene.

*Example Series 1*

100 gram samples of an unsaturated polyester derived from maleic anhydride, phthalic anhydride and propylene glycol were dissolved in styrene and were mixed with 0.2 millilitre of a vanadium naphthenate solution in ethyl acetate containing 5 grams of vanadium per litre, 0.5 millilitre of the cumene hydroperoxide solution and 0.5 millilitre of the phosphate shown in Table 1. The gel time at room temperature is recorded in Table 1. It will be noted that comparatively short gel times are obtained. By way of comparison similar compositions were tested using either no phosphate or neutral phosphate esters in place of the acid esters according to the invention. Long gel times resulted and, in most cases, the curing reaction was not sufficiently active to produce an appreciable exotherm. These comparative results are included in Table 1.

TABLE 1

| Acid phosphate | Gel time, minutes |
|---|---|
| Di-butyl hydrogen phosphate | 8 |
| Di-ethyl hydrogen phosphate | 23 |
| Di-nonyl hydrogen phosphate | 11 |
| Comparative Experiments | |
| No phosphate | 1,100 |
| Tri-ethyl phosphate | 1,100 |
| Tri-allyl phosphate | 1,100 |
| Tri-cholor ethyl phosphate | 1,100 |
| Phosphoric acid | Incompatible |

*Example Series 2*

240 gram samples of the unsaturated polyester solution used in Example Series 1 were mixed with 0.1 millilitre of a vanadium naphthenate solution in ethyl acetate containing 30 grams of vanadium per litre, 0.6 millilitre of the cumene hydroperoxide solution and the indicated quantities of liquid acid phosphate ester. The gel time at an ambient temperature of 18 C. was recorded. The results are given in Table 2.

TABLE 2

| Liquid acid phosphate ester | Mls. per 100 gm. of soln. | Gel time, minutes |
|---|---|---|
| Control—No phosphate | Nil | 630 |
| Di-butyl hydrogen phosphate | 0.25 | 37 |
| Do | 0.50 | 32 |
| Di-iso-octyl hydrogen phosphate | 0.15 | 137 |
| Do | 0.25 | 137 |
| Do | 0.50 | 185 |
| Do | 0.75 | 360 |
| Di-n-octyl hydrogen phosphate | 0.25 | 327 |
| Do | 0.50 | 460 |
| Di-methyl hydrogen phosphate | 0.25 | 452 |
| Do | 0.50 | 507 |

*Example Series 3*

A first series of 100 gram samples of the unsaturated polyester solution used in Example Series 1 were mixed with the cumene hydroperoxide solution (0.5 millilitre) and the indicated quantities of vanadium were added in ethyl acetate solution. A second series of similar samples were prepared containing in addition to the above, 0.5 millilitre of di-butyl hydrogen phosphate. The gel times at an ambient temperature of 21° C. are recorded in Table 3.

TABLE 3

| Quantity of vanadium metal added per 100 g. polyester resin solution | Gel time, minutes |
|---|---|
| In The Absence of Phosphate | |
| Grams vanadium: | |
| 0.00225 | [1] 360 |
| 0.0045 | 165 |
| 0.00675 | 120 |
| 0.009 | 75 |
| 0.01125 | 60 |
| With Added Di-Butyl Hydrogen Phosphate | |
| Grams vanadium: | |
| Nil | >360 |
| 0.00025 | 52 |
| 0.00050 | 26 |
| 0.00075 | 22 |
| 0.00100 | 14 |
| 0.00125 | 11 |
| 0.00150 | 10 |
| 0.0020 | 7 |
| 0.0040 | <7 |
| 0.0080 | 7 |
| 0.0160 | 10 |

[1] Approximate.

*Example Series 4*

A solution of vandadium in di-butyl acid phosphate was obtained by charging a vessel fitted with a stirrer with 8.9 grams of vanadium pentoxide and 25 grams of the di-butyl acid phosphate and heating the mixture to 150° C. with stirring. The solution obtained was cooled and diluted to a vanadium concentration of 5 grams of vanadium per litre by the addition of ethyl acetate.

100 gram samples of the unsaturated polyester solution used in Example Series 1 were mixed with 1 millilitre of the above vanadium solution and with 0.5 millilitre of various peroxidic catalyst solutions. The gel times and the mixture temperatures at these times are recorded in Table 4.

TABLE 4

| Peroxide system | Gel times, minutes | Temperature, ° C. |
|---|---|---|
| The cumene hydroperoxide solution | 5 | 30.5 |
| 2,2 bis (tertiary butyl peroxy) butane: 50% solution in a phthalate plasticiser | 8.5 | 32 |
| Tertiary butyl hydroperoxide: 60% solution in dimethyl phthalate | 8.5 | 31 |
| Methyl ethyl ketone peroxide: 60% solution in dimethyl phthalate | 14.5 | 34 |
| Methyl ethyl ketone peroxide: 60% solution in a phthalate plasticiser | 16.5 | 29.5 |
| Methyl iso-butyl ketone peroxide: 80% solution in a phthalate plasticiser | 19.0 | 32 |
| Cyclohexanone peroxide: 50% solution in a phthalate plasticiser | 20.0 | 30.5 |
| Tertiary butyl perbenzoate: 50% solution in a phthalate plasticiser | 31.0 | 29.5 |

*Example Series 5*

A series of compositions consisting of 100 grams of an air drying mixture of an unsaturated polyester resin and a cross-linking monomer and 10 millilitres of a catalyst solution of the following composition:

| | Parts by weight |
|---|---|
| Cyclohexanone peroxide | 10 |
| Cumene hydroperoxide (70%) | 10 |
| Methyl ethyl ketone peroxide (50%) | 20 |
| Ethyl acetate | 140 | were tested with various amounts of the vanadium solution described in Example 4 and with a cobalt octoate solution containing 2% by weight of cobalt made by diluting a solution of cobalt octoate in xylol containing 12% by weight of cobalt with ethyl acetate. The results obtained are given in Table 5.

TABLE 5

| Promoter | Gm. metal per 100 gm. resin | Gel time at 25° C. | Temp. of resin, ° C. | Time to reach peak exotherm temp. in mins. | Temp. of resin, ° C. |
|---|---|---|---|---|---|
| Vanadium/butyl phosphate | 0.0044 | 15 | 33 | 31 | 75 |
| Do | 0.0077 | 12 | 34 | 25 | 70.5 |
| Do | 0.0110 | 10 | 35 | 22 | 69.5 |
| Cobalt octoate | 0.027 | 19 | 30 | 49 | 39 |
| Do | 0.036 | 16 | 29.5 | 42 | 38.5 |
| Do | 0.045 | 14 | 31 | 37 | 37.5 |

It will be seen that even with quite high cobalt concentrations the gel times are longer and the peak exotherm temperatures lower than with systems containing much smaller amounts of vanadium/acid butyl phosphate promoter according to the present invention.

*Example Series 6*

Equal quantities of triallyl phosphate and a solution in styrene of an unsaturated polyester derived from fumaric acid, carbic acid and ethylene glycol were mixed to provide a composition having a gel time of 30 minutes at an ambient temperature of 25° C. after the addition of vanadium naphthenate to give a 0.006% vanadium concentration, 0.03% of di-butyl hydrogen phosphate and 0.25% cumene hydroperoxide. By way of contrast the same mixture when mixed with cobalt octoate to a concentration of 0.018% cobalt and with 1.07% of methyl ethyl ketone peroxide had a gel time of 1500 minutes in spite of the higher metal concentration and more active peroxide catalyst employed.

*Example Series 7*

A polyester resin based on carbic acid, maleic anhydride and ethylene glycol, and dissolved in styrene was mixed with various amounts of cobalt and vanadium promoters. The cobalt was added as a solution of cobalt octoate in ethyl acetate containing 1% by weight of metal. The vanadium was added as a solution of vanadium pentoxide in di-butyl acid phosphate and ethyl acetate containing 0.6% by weight of metal. After mixing with 10% by weight of the catalyst solution described in Example Series 5, thick films were applied to a surface having a white background and allowed to cure. Table 6 shows the relation between the promoter concentration in the polyester and the colour of the cured polyester film. Cobalt and vanadium used individually produce films with marked green colours whereas a 5:3 ratio of cobalt to vanadium produces a film which has only a very light amber colour.

TABLE 6

| Metal concentration | | Colour of film |
|---|---|---|
| Cobalt, percent by wt. | Vanadium, percent by wt. | |
| .05 | ---------- | Pronounced yellow-green. |
| .025 | .015 | Minimum colour, very pale amber. |
| .017 | .020 | Colour increasing. |
| .013 | .023 | |
| ---------- | .03 | Pale green. |

*Example Series 8*

The gel times of a number of unsaturated polyester compositions containing various monomers were measured using (1) a vanadium catalyst system according to the present invention and (2) a cobalt system according to the prior art. Each test was made on a mixture of 50 grams of the unsaturated polyester solution used in Example Series 6 and 50 grams of the monomer indicated in Table 7. In the case of the vanadium/phosphate promoted systems, 2.0 millilitres of the vanadium/phosphate solution described in Example Series 4 and 0.5 millilitre of the cumene hydroperoxide solution were added. The comparative cobalt promoted systems were prepared by adding 1.5 millilitres of a 2% solution of cobalt octoate in ethyl acetate and 10 millilitres of a 10% solution of methyl ethyl ketone peroxide solution in a mixture of 1 part of dimethyl phthalate and 9 parts of ethyl acetate. The results obtained are given in Table 7 and show the much greater effectiveness of the vanadium/acid phosphate promoter system.

TABLE 7

| Monomer added | Gel time in minutes | |
|---|---|---|
| | Cobalt promoted system containing 0.03% metal | Vanadium promoted system containing 0.01% metal |
| Ethylene glycol dimethacrylate | 120 | 2 |
| Tri-allyl cyanurate | 300 | 63 |
| Diallyl maleate | ca. 1,400 | 60-120 |
| Acrylonitrile | ca. 1,400 | 18 |

I claim:
1. A process for the cure of a composition containing an unsaturated polyester mixed with a cross linking monomer which comprises mixing said composition with a catalyst system which includes a peroxidic compound selected from the group consisting of organic peroxides and hydroperoxides and a solution of a vanadium compound in a liquid acid phosphate ester of the formula:

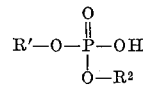

wherein R' is lower alkyl and R² is lower alkyl or hydrogen.

2. A process as claimed in claim 1, wherein the monomer is styrene.
3. A process as claimed in claim 1, wherein the monomer is triallyl phosphate.
4. A process as claimed in claim 1, wherein the monomer is a mixture of triallyl phosphate, styrene and acrylonitrile.
5. A process as claimed in claim 1, wherein the composition contains from 40 to 80% by weight of unsaturated polyester and from 60 to 20% by weight of cross-linking monomer.
6. A process as claimed in claim 1, wherein the peroxidic compound is cumene hydroperoxide.
7. A process as claimed in claim 1, wherein the vanadium compound is vanadium oxide.
8. A process as claimed in claim 1, wherein the concentration of vanadium in the liquid acid phosphate ester is 0.1 to 3% by weight.
9. A process as claimed in claim 1, wherein the amount of vanadium is in the range 0.00018% to 0.02% by weight of the total weight of polymerisable material present.
10. A process as claimed in claim 1, wherein a soluble cobalt compound and a mixture of at least two peroxidic catalysts are present.
11. A process as claimed in claim 10, wherein the ratio of cobalt to vanadium is about 5 parts by weight of cobalt to 3 parts by weight of vanadium.
12. A process as claimed in claim 10, wherein the total weight of metal is from 0.01 to 0.04% of the weight of polymerisable material present.

References Cited by the Examiner

UNITED STATES PATENTS

| 2,409,774 | 10/1946 | Mack et al. | 260—461 |
| 2,456,824 | 12/1948 | Fischer | 260—461 |
| 2,795,549 | 6/1957 | Abbott et al. | 252—49.7 |
| 2,801,233 | 7/1957 | Minsk et al. | 260—86.7 |
| 2,865,865 | 12/1958 | Ockrent et al. | 252—430 |
| 2,963,447 | 12/1960 | Peters et al. | 252—430 |
| 3,003,991 | 10/1961 | Marszewski et al. | 260—863 |
| 3,022,277 | 2/1962 | Nelson | 260—86.7 |

FOREIGN PATENTS 1,070,819  12/1959  Germany.

MURRAY TILLMAN, *Primary Examiner.*

JULIUS GREENWALD, *Examiner.*

R. D. LOVERING, J. T. GOOLKASIAN,
*Assistant Examiners.*